United States Patent [19]

Eidschun et al.

[11] Patent Number: 5,039,050
[45] Date of Patent: Aug. 13, 1991

[54] EQUIPMENT MOUNTING APPARATUS

[76] Inventors: Robert W. Eidschun, 29210 Pointe O Woods Pl., Suite 205, Southfield, Mich. 48034; Daniel N. Holtzman, 115 Mount Auburn St., Apt. 43, Cambridge, Mass. 02138

[21] Appl. No.: 399,241

[22] Filed: Aug. 25, 1989

[51] Int. Cl.$^5$ ............................................. E04G 3/00
[52] U.S. Cl. .................................. 248/279; 352/132; 354/81; 354/293; 248/285
[58] Field of Search ............ 248/279, 287, 285, 205.5; 352/132, 243; 354/75, 76, 81, 293, 294

[56] References Cited

U.S. PATENT DOCUMENTS

| | | | |
|---|---|---|---|
| 574,877 | 1/1897 | Blomiley | 248/287 X |
| 2,783,015 | 2/1957 | Kampa | 248/279 |
| 2,915,944 | 12/1959 | Butts | 248/279 |
| 2,994,501 | 8/1961 | Barnard | 248/279 |
| 3,221,743 | 12/1965 | Thompson et al. | 248/279 |
| 3,586,278 | 6/1971 | Simons | 354/81 X |
| 3,638,889 | 2/1972 | Samuelson | 354/293 X |
| 3,891,301 | 6/1975 | Heller | 354/81 X |
| 4,029,246 | 6/1977 | Woodruff . | |
| 4,030,114 | 6/1977 | Telfer | 354/81 X |
| 4,614,943 | 9/1986 | Boucher | 354/293 X |
| 4,615,597 | 10/1986 | Burriss . | |
| 4,915,333 | 4/1990 | Bolondi | 354/293 X |

FOREIGN PATENT DOCUMENTS

| | | | |
|---|---|---|---|
| 1276816 | 10/1961 | France | 248/205.5 |
| 1044398 | 9/1966 | United Kingdom | 248/205.5 |

OTHER PUBLICATIONS

Ronford Baker, Low Angle Tripod.
Matthews Auto-Mount System, Auto Mounts and Camera Mounting Accessories.
American Studio Equipment, Car Mounts and Accessories.
Mole-Richardson, Molevac Car Kit Type 7011.
Egripment BV, Power Grip.
Samcine Camera Mount.

Primary Examiner—Gary L. Smith
Assistant Examiner—Michael Milano
Attorney, Agent, or Firm—Dykema Gossett

[57] ABSTRACT

The inventon is for an assembly for a mounting frame that has at least three rails or elongated frame members. The assembly comprises a pair of couplings and means for fastening the couplings to each other. Each coupling includes means for receiving one of the rails, the coupling element and the rail being movable relative to each other longitudinally of the rail. Further, each coupling includes means for securing the rail at a preselected longitudinal position relative to the coupling. One of the couplings has means for connecting the third rail to itself. When the couplings are fastened to one another, the receiving means on each coupling are disposed to support the first two rails in crossed or non-parallel relationship to one another.

The invention is also for an apparatus for mounting an article on support means. The mounting apparatus comprises a frame having at least three rails, means for attaching the frame to the support means at at least three non-collinear locations, and an assembly comprising a pair of couplings.

45 Claims, 4 Drawing Sheets

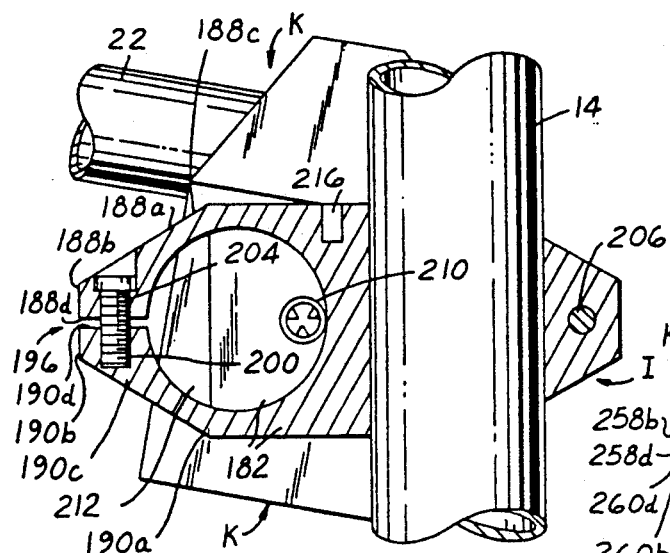
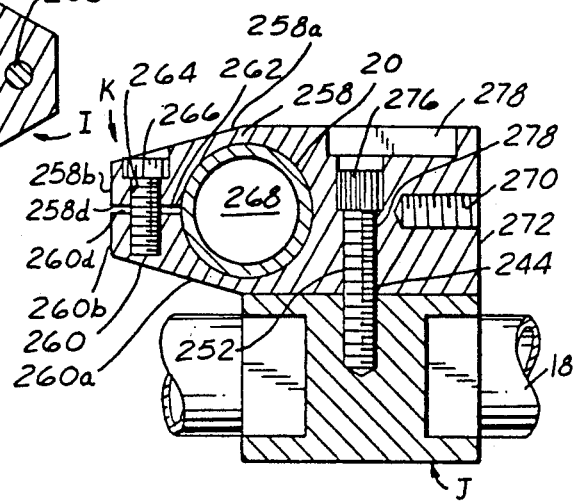
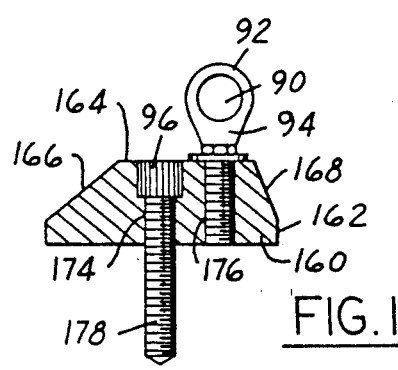
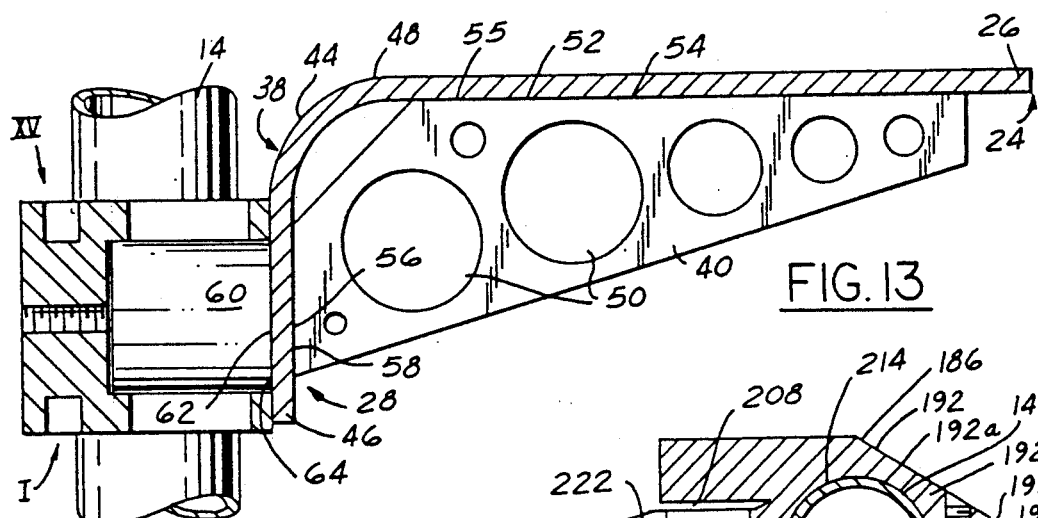
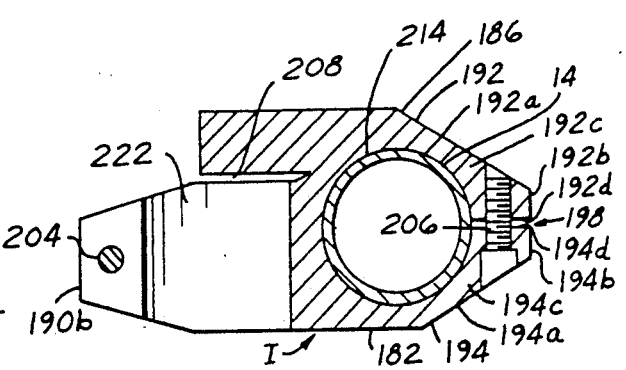

EQUIPMENT MOUNTING APPARATUS

BACKGROUND

1. Field of the Invention

The invention relates to an apparatus for adjustably mounting an article to a support surface, and particularly an apparatus for mounting a piece of audiovisual equipment, such as as a camera, to a vehicle.

2. Description of the Related Art

In order to achieve greater realism or desired cinematographic effects in motion pictures, television productions, commercials, video productions, and engineering or scientific studies, it is often essential that film and video cameras, lighting, sound equipment and other audiovisual equipment be mounted directly to a moving automobile, motorcycle, truck, boat, airplane or other vehicle.

Several equipment mounts for securing professional film and video cameras to suitable surfaces are available. For example, the Ronford-Baker "Low Angle Tripod," which is described in British Patent 1,157,990 and commercially available from Birns & Sawyer, Inc., of Los Angeles, Calif., is adapted to rigidly attach professional film and video cameras to a vehicle. However, once the basic configuration of the tripod is selected and the various couplings of the device tightened, the location and orientation of its camera mounting plate and the camera which is secured thereto are fixed. Furthermore, the Tripod is not readily attachable to surfaces of arbitrary shape.

In addition, the "Matthews Auto-Mount System," manufactured by and commercially available from Matthews Studio Equipment of Burbank, Calif., allows for a camera to be mounted adjacent to an automobile wheel or to a flat horizontal surface such as an automobile hood, roof or rear deck. Similarly, the "Hood Mount," manufactured by American Studio Equipment of Sun Valley, Calif., enables a camera to be mounted on the hood of an automobile. However, neither mount is capable of positioning a camera adjacent to the door of a vehicle or inside a vehicle.

Several systems enable a camera to be mounted to the vertical surface provided by a vehicle door. Examples include the Matthews Studio Equipment "Side Mount," the American Studio Equipment "Hostess Tray," and the system disclosed in U.S. Pat. No. 4,615,597, issued on Oct. 7, 1986 to Burris. However, these devices do not allow a camera to be mounted inside a vehicle or mounted to a horizontal surface such as the hood, roof or rear deck of an automobile.

U.S. Pat. No. 4,029,246, issued to Woodruff on June 14, 1977, discloses an Adjustable Stable Camera Support for Vehicles which enables a camera to be mounted inside a vehicle but not elsewhere.

An apparatus identified as the "Type 7011 Molevac Car Kit," manufactured by Mole-Richardson Co., of Hollywood, Calif., allows professional movie lights to be mounted to flat horizontal or vertical surfaces such as the hood or door of a vehicle. However, the apparatus does not allow lights to be secured to a surface of arbitrary shape nor does it allow for the mounting of professional movie cameras to a vehicle.

As can be seen therefore, prior art devices lack versatility; many can be used only for specific applications such as mounting equipment to flat horizontal surfaces, flat vertical surfaces, or inside a vehicle. In general, the above-described devices cannot be readily secured to surfaces of arbitrary shape, even though the desired equipment configuration may require that the mounting apparatus be so arranged. Also, once the mounting apparatus has been positioned and secured, the degree to which the camera or other mounted equipment can be adjusted to assume arbitrary orientations with respect to the mounting surface, without disassembling the apparatus, is limited. Once the basic equipment configuration has been selected, fully articulated, universal movement of the mounting apparatus is not possible. Similarly, existing devices do not allow a camera to be positioned in an arbitrary relationship with respect to the vehicle, further limiting their utility and flexibility. Positioning of the camera is dictated by the shape and orientation of the mounting surface rather than by the needs of the cinematographic production.

Many of the prior art devices require the mounting structure to be stabilized and secured with a myriad of heavy clamps or adjustable straps. As well, the mounted equipment, except when used in accordance with the limited applications of the above described predecessor arrangements, has a tendency to rotate with respect to the mounting apparatus even after it has been secured because of the vibrations generated by the moving vehicle and because the prior devices lack structural means for resisting rotation. Finally, some setups require partial disassembly of the vehicle to enable access to a securing surface such as the vehicle's frame.

It would be desirable to provide a single apparatus that could be easily secured to a horizontal, vertical or inclined surface as well as an apparatus that could be mounted to both the interior and exterior of a vehicle. The flexibility provided by such an arrangement would eliminate the need for separate devices to mount equipment in each of these situations. Obviously this would result in reduced equipment requirements and costs.

It would also be desirable for such single apparatus to be adapted to attach to an object of arbitrary shape. This feature would dramatically enhance the flexibility and utility of the apparatus. It would also be an improvement over earlier devices to provide a fully articulated assembly that would allow mounted equipment to assume an infinite variety of positions and arbitrary orientations with respect to the vehicle to which the equipment is mounted. This would expand the flexibility of the system because the equipment could be positioned in the precise location that would achieve the most realistic production.

Finally, it would be advantageous to provide a system that is free of numerous additional clamps and straps for stabilizing the mount while at the same time providing a structure which inherently resists rotational movement of the mounted equipment.

SUMMARY OF THE INVENTION

The invention is for a coupling assembly (or assembly) for a mounting frame that has at least three elongated frame members. The coupling assembly comprises a pair of coupling elements (or couplings) and means for fastening the coupling elements to each other. Each coupling element includes means for receiving one of the elongated frame members, the coupling element and the frame member being movable relative to each other longitudinally of the frame member. Further, each coupling element includes means for securing the elongated frame member at a pre-selected longitudinal position relative to the coupling element.

One of the coupling elements has means for connecting to itself the third elongated frame member. When the coupling elements are fastened to one another, the receiving means on each coupling element are disposed to support the first two frame members in crossed or non-parallel relationship to one another.

The means for fastening the coupling elements to one another includes pivot means that allows for relative rotation between the coupling elements.

Each coupling element comprises a block-like member and each of the receiving means comprises an opening extending through the block-like member, the opening being adapted to slidably receive one of the elongated frame members. The receiving means are circular in cross section and are configured to permit rotation of the elongated frame member relative to the coupling.

The means for securing the elongated frame members to the coupling elements comprises means for clamping, gripping or engaging the elongated frame members to the coupling elements. The clamping means comprises a split collar portion having a pair of opposed jaws or wings; inner surfaces of the jaws or wings define the opening that receives the elongated frame member. The clamping means further include pin means for drawing the jaws or wings toward one another to secure the elongated frame member therebetween.

The invention is also for an apparatus for mounting an article on support means. The mounting apparatus comprises a frame having at at least three elongated frame members, means for attaching the frame to the support means at at least three non-collinear locations, and a coupling assembly.

The coupling assembly comprises first and second coupling elements. The first coupling element has first means for receiving one end of one of the frame members, such that the frame member and the coupling element can move relative to each other longitudinally of the first frame member. The first coupling element further includes first means for securing the frame member at a pre-selected longitudinal position relative to the first coupling element.

The second coupling element has second means for receiving the second frame member, such that the coupling element and the frame member are movable relative to each other longitudinally of the second frame member. The second coupling element further includes second means for securing the second frame member at a pre-selected longitudinal position relative to the second coupling element. The second coupling element additionally includes first means for connecting the third frame member to the second coupling element. The third frame member is adapted to support the article.

The coupling assembly further comprises means for fastening the first and second coupling elements to one another such that the first and second receiving means are disposed to receive the first and second frame members in non-parallel or crossed relation to one another. The means for fastening the coupling elements to one another includes pivot means that allows for relative rotational movement between the first and second coupling elements.

The first and second coupling elements comprise block-like members and the means for receiving the frame members comprise openings extending through the block-like members. The openings are adapted to slidably and rotatably receive the frame members.

The means for securing the elongated frame members to the coupling elements comprise means for clamping, gripping or engaging the coupling elements to the frame members. The clamping means comprise split collar portions having opposed jaws or wings, inner surfaces of which define the openings that receive the frame members. The clamping means further includes pin means for drawing the jaws or wings toward one another to secure the frame members between the jaws.

The means for attaching the frame to the support means is adapted to mount at least two of the frame members on the support means at three non-collinear locations. The attaching means comprises a plurality of attachment assemblies; at least one of the attachment assemblies is adapted to adjustably mount one of the frame members on the support means for universal movement about three mutually perpendicular axes relative to the support means.

The adjustable attachment assembly comprises means for anchoring the attachment assembly on the support means, a third coupling element for connecting the attachment assembly to one of the frame members, and articulating means for interconnecting the anchoring means and the third coupling element thereby allowing for universal movement of one relative to the other.

The articulating means comprises a first articulating element that is adapted to be mounted on the anchoring means, a second articulating element that is adapted to be mounted on the third coupling element, means for pivotally mounting the first articulating element on the second articulating element, and means for pivotally mounting the second articulating element on the third coupling element. The two pivoting means cooperate to permit universal movement of the third coupling element relative to the anchoring means.

The means for pivotally mounting the first articulating element on the second articulating element comprises a spherical member carried by one end of the first articulating element and a socket formed within a portion of the second articulating element, the spherical member being securely received within the socket to permit limited universal movement of the second articulating element relative to the first articulating element. The means for pivotally mounting the second articulating element to the third coupling element comprises a cylindrical member interconnecting the second articulating element and the third coupling element.

The attachment assembly may further comprise means for fixing the second articulating element at a pre-selected position relative to the third coupling element.

The means for anchoring the apparatus to the support means may comprise a plate having a multiplicity of through holes adapted to receive bolt means such that the bolt means and the plate are engageable with the support means. In an alternative embodiment, the anchoring means may comprise a suction cup adapted to mattingly engage the support means.

The apparatus also comprises means for adjustably mounting the article on the third frame member for universal movement about three mutually perpendicular axes relative to the third frame member. The mounting means comprises a bracket for supporting the article and a fourth coupling element. The fourth coupling element has means for rotatably receiving the third frame member and means for connecting the bracket to the fourth coupling element, such that the bracket is rotatable relative to the fourth coupling element. The bracket is permitted to have universal movement relative to the third frame member about three mutually perpendicular axes.

BRIEF DESCRIPTION OF THE DRAWINGS

For a more complete understanding of the invention, reference should now be had to the embodiments illustrated in the accompanying drawings and described below. In the drawings:

FIG. 10 is a sectional view taken along lines 10—10 in FIG. 4;

FIG. 11 is a sectional view taken along lines 11—11 in FIG. 3;

FIG. 12 is a sectional view taken along lines 12—12 in FIG. 5;

FIG. 13 is a sectional view taken along lines 13—13 in FIG. 7; and

Figure 4:
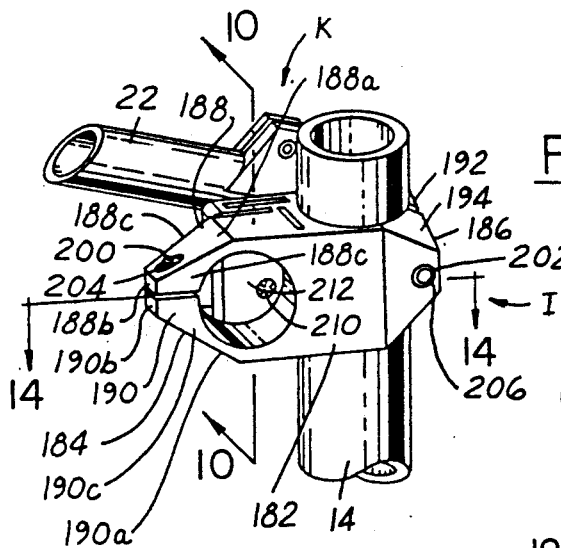
FIG. 4 is an enlarged perspective view looking in the opposite direction of an area of interest designated by reference numeral C in FIG. 1.

FIG. is a sectional view taken along lines 14—14 in FIG. 4.

DESCRIPTION OF THE PREFERRED EMBODIMENTS

Figure 1:
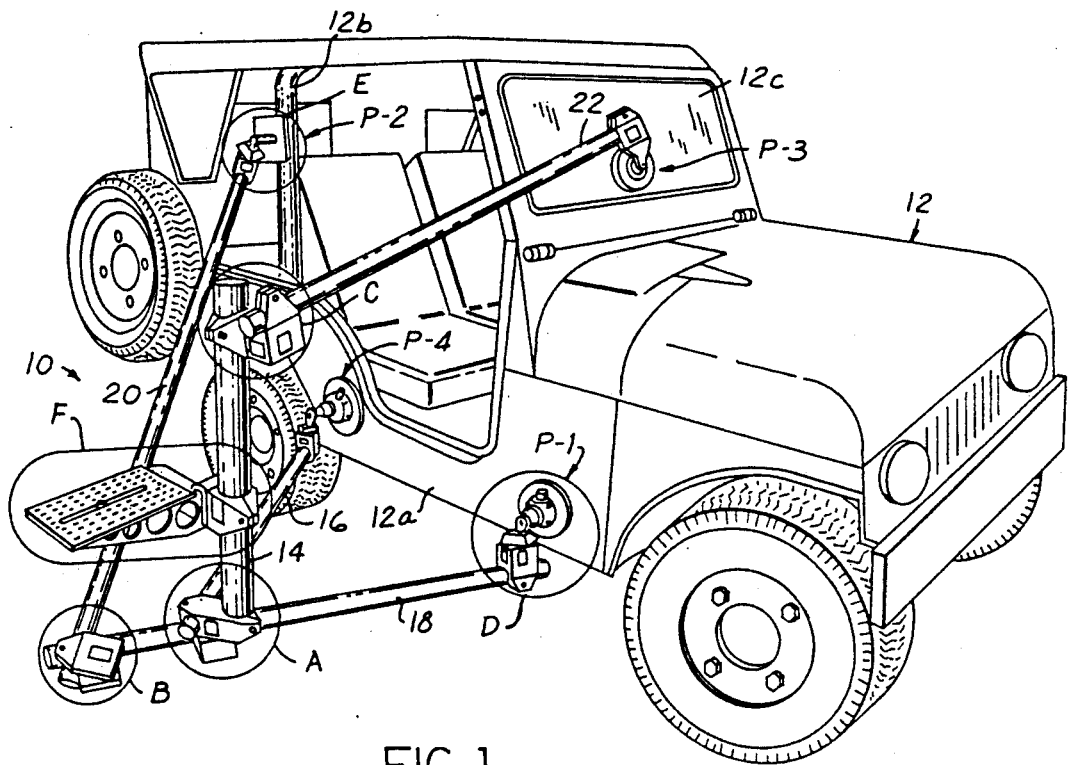
FIG. 1 is a perspective view of the invention in the form of an equipment mounting apparatus, showing the apparatus mounted on a vehicle.

Referring now to the drawings, and in particular to FIG. 1, the invention in the form of an equipment mounting apparatus, designated generally as 10, is shown in conjunction with a motor vehicle 12, which includes a side panel 12a, a roll bar 12b, and a windshield 12c. The motor vehicle 12 forms no part of the apparatus 10 in its broader aspects. Any type of motor vehicle including automobiles, trucks, vans, motorcycles, etc. may be suitably employed in connection with the equipment mounting apparatus 10. Similarly, the equipment mounting apparatus 10 may be mounted to vehicles other than motor vehicles such as watercraft, aircraft and trains. Further, the apparatus 10 may be mounted to a nonmoving support surface, such as an exterior wall of a building.

The equipment mounting apparatus 10 comprises generally a frame which provides the basic structural outline of the apparatus 10, equipment mounting means to which the relevant equipment may be attached, securing means (sometimes referred to as attaching means) for mounting the apparatus 10 to the vehicle 12, and interconnection means for attaching (1) the frame to the securing means, (2) the various elements of the frame to one another, and (3) the equipment mounting means to the frame. In FIG. 1, the equipment mounting apparatus 10 is secured to the vehicle 12 at four points, identified, respectively, by the reference numerals P-1 through P-4.

Figure 1A:
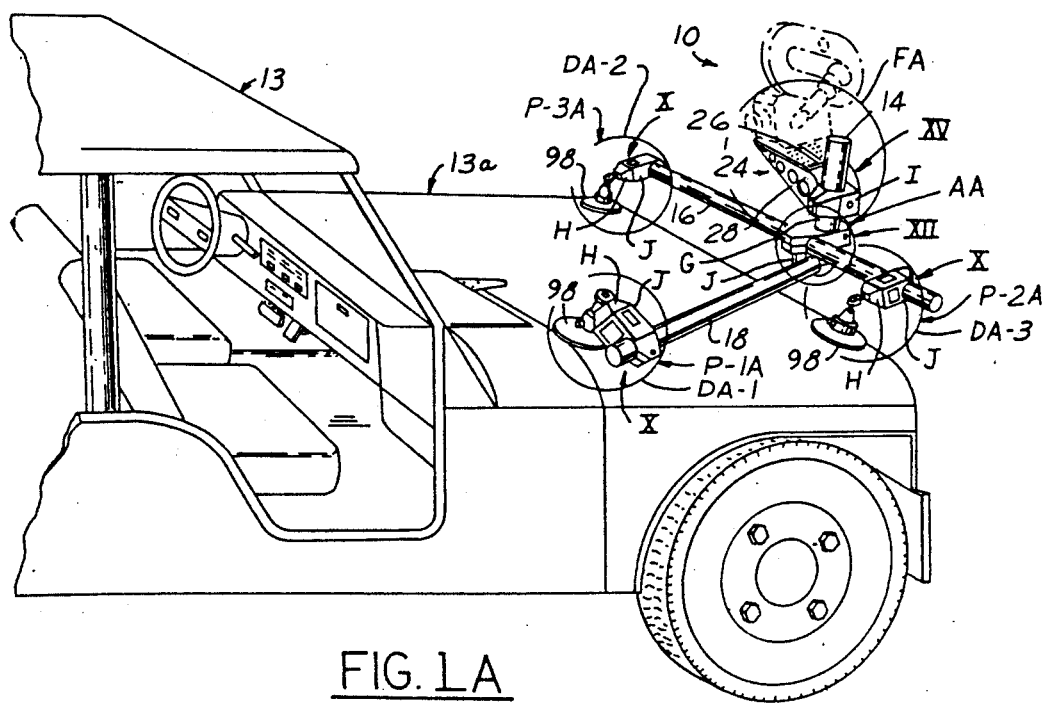
FIG. 1A is a perspective view of the invention in the form of the equipment mounting apparatus, showing the apparatus mounted on a vehicle but utilizing a different arrangement than illustrated in FIG. 1.

FIG. 1A similarly shows the equipment mounting apparatus attached to a vehicle 13. The equipment mounting apparatus of FIG. 1A comprises the same fundamental elements as disclosed in FIG. 1; namely, a frame, equipment mounting means, securing or attaching means, and interconnection means. The overall arrangement of the equipment mounting apparatus of FIG. 1A is significantly different from that shown in FIG. 1 evidencing the tremendous flexibility of the invention. As explained hereinbelow, the various components which comprise the fundamental elements noted above can be configured in an infinite number of arrangements to adapt to the myriad of situations in which the equipment mounting apparatus finds use. Also, as will become apparent, the invention, more generally, is for an apparatus for mounting an article on support means.

It is most important to note that the arrangement of FIG. 1A requires that the equipment mounting apparatus be secured to the support surface or support means provided by a hood 13a of the vehicle 13 at only three non-collinear points, identified, respectively, by the reference numerals P-1A through P-3A, this being the minimum number of points of attachment required to successfully practice the invention. Although the configuration of FIG. 1 describes four points of attachment, P1-P4, this is principally for purposes of illustrating an alternative and more complex arrangement of the equipment mounting apparatus in which some assemblies not shown in FIG. 1A are described. The actual number of points of attachment will be dictated by the complexity of the support surface and the particular circumstances in which the apparatus 10 finds use, it being emphasized that the number of points of attachment will always, at a minimum, be three.

It is also worth noting that the arrangement of FIG. 1A requires only an extension rail 14 and two support rails 16, 18 (which will be explained more fully hereinbelow), with two of the points of attachment, P-2A and P-3A, being carried by the support rail 16. This illustrates that a minimum of two support rails and one extension rail, interconnected by an assembly XII (described below), and three points of attachment to a support surface is all that is necessary to employ the equipment mounting apparatus in accordance with the invention.

It should also be noted that although FIG. 1A describes two of the three points of attachment as being carried by one of the three rails, the minimum arrangement of FIG. 1A can also be configured such that each of the three rails carries one of the points of attachment.

The Frame

Referring to FIG. 1, the frame comprises an extension rail 14 and support rails 16, 18, 20 and 22 (each rail sometimes hereinafter referred to as a "frame member" or an "elongated frame member"), it being understood that the number of rails and their configuration is dictated by the complexity and requirements of the application in which they find use. As noted above, a minimum of only two support rails and the extension rail are required for practice of the invention.

Each support rail 16–22 is an elongated, hollow, tubular, aluminum member formed from, in the preferred embodiment, IPS Schedule 40 1¼" pipe. The length of each rail 16–22 (as well as the diameter) is not critical to successful practice of the invention, although lengths of approximately two to six feet have been found to provide maximum utility.

The extension rail 14 also comprises an elongated, hollow, tubular aluminum member. In the preferred embodiment, the rail 14 is formed from IPS Schedule 40 2" pipe, although the diameter is not critical. Similarly, the length of the extension rail 14 is not critical to successful practice of the invention, although a length of approximately one to two feet has been found to be the most useful. In the preferred embodiment, the diameter of the extension rail 14 is greater than the diameter of each support rail 16–22, the significance of which will be explained below. However, it should be understood that the diameter of the extension rail and the support rails may be the same, thereby making the rails fully interchangeable.

The Equipment Mounting Means

Figure 7:
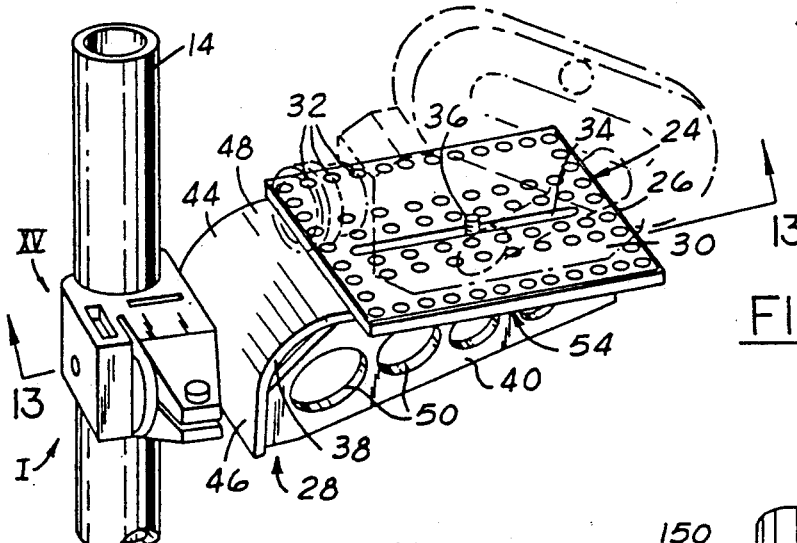
FIG. 7 is an enlarged perspective view of an area of interest designated by reference numeral F in FIG. 1.

As best shown in FIGS. 7 and 13, the equipment mounting means comprises, in part, a substantially L-shaped bracket or equipment mount 24 having a mounting plate 26 and a support base 28. The remaining aspects of the equipment mounting means includes an assembly XV, which is described hereinbelow. The mounting plate 26 is shown in the form of a rectangular, substantially flat table-like member formed with a multiplicity of through holes 32 and a longitudinal slot 34 positioned approximately along the table-like member's central longitudinal axis. The holes 32 and the slot 34 are dimensioned to receive in registry commercially available mechanical fasteners, an example of which is shown in the form of a threaded stud or captive screw 36. The captive screw 36 may be used to secure a piece of equipment, for example, a movie camera (as shown in FIG. 7 in phantom line) to the mounting plate 26 of the equipment mounting means. In the typical case, the equipment or article to be mounted will have a threaded socket that engageably receives the threaded stud or captive screw 36. The holes 32 and the slot 34 provide flexibility in positioning the equipment to be mounted; the equipment may be located almost anywhere on the mounting plate 26.

The support base 28 comprises a right angle or L-shaped portion 38 and a pair of rigidly secured gussets or reinforcing means 40 (of which only one is shown in the drawings). The gussets 40 are disposed in parallel, spaced apart relationship to one another. Transverse braces (not shown in the drawings) which span the gap between the gussets 40 may be provided for additional support.

The right angle portion 38 is formed with a contoured section 44 which is integral with and intermediate first and second legs or straight sections 46, 48 and which maintains the straight sections in an approximately 90 degree or normal relation. The second straight section 48 is integral with the mounting plate 26. The gussets 40 resist relative deflection of the first and second straight sections 46, 48 and are preferably formed with a plurality of apertures 50 to reduce the weight of the equipment mounting means and the apparatus 10.

The gussets 40 may be rigidly secured to the L-shaped portion 38 and the plate 26 by, for example, welding upper edges 52 of the gussets 40 to both an undersurface 54 of the plate 26 and an undersurface 55 of the second straight section 48 and also by welding an inner edge 56 of the gussets to an inner surface 58 of the first straight section 46.

The support base 28 further comprises a mounting member, in the form of a post 60, for attaching the equipment mounting means and, also forming part of the interconnection means, the assembly XV for mounting the equipment mounting means on the frame. The post 60 is a short cylindrical member open at each end. A first end 62 of the post 60 is rigidly secured to an outside surface 64 of the first straight section 46 such that the post 60 extends perpendicular to the first straight section 46. The significance of the post 60 will become apparent in the following discussion.

The perspective view of FIG. 7 illustrating the equipment mounting means of FIG. 1 is substantially similar to the area of interest identified by the reference numeral FA in FIG. 1A. That is, an equipment mount or bracket 24 having a mounting plate 26 and a support base 28 is used to mount a piece of equipment, such as the camera shown in phantom line, to support means, such as provided by the hood 13a of the vehicle 13.

The Securing Means

Figure 5:
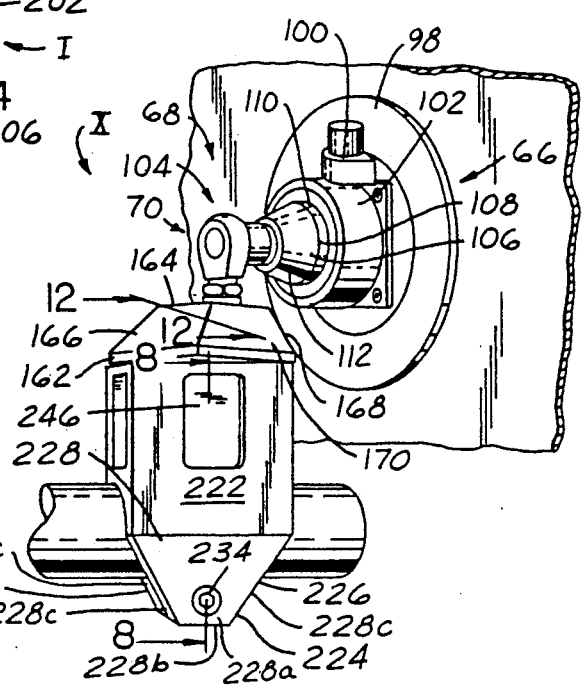
FIG. 5 is an enlarged perspective view of an area of interest designated by reference numeral D in FIG. 1.
Figure 6:
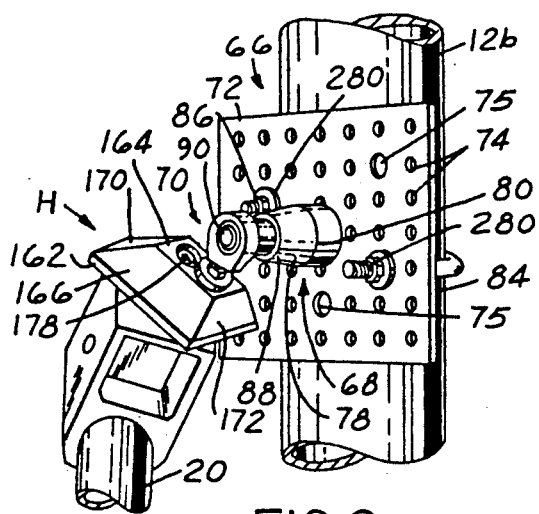
FIG. 6 is an enlarged perspective view of an area of interest designated by reference numeral E in FIG. 1.

As best shown in FIGS. 5, 6 and 12, the securing means (hereinafter sometimes referred to as the "attachment means") mounts the apparatus 10 to the vehicle 12 and includes, in part, attachment assemblies having an anchoring device 66, an anchor adapter 68, and articulating means shown in the form of a linkage 70 allowing for limited universal movement. As explained more fully hereinbelow, the securing or attachment means also comprises assemblies for mounting the above noted components to the frame.

In one embodiment of the securing or attachment means (FIGS. 6 and 12), the anchoring device 66 is in the form of a square attachment plate 72 having a multiplicity of through holes 74 and several countersunk holes 75. Each countersunk hole 75 provides a mounting location for the anchor adapter 68. The anchor adapter 68 (or, more generally, a cylindrical member) is in the form of an attachment plate section 76 having a cone shaped section 78, a broad end 80 of which is formed integral with a cylindrical base 82. The cylindrical base 82 of the attachment plate section 76 is provided with a threaded axial bore (not shown separately in the drawings). The attachment plate section 76 is held tightly against the attachment plate 72 by the registration of a mechanical fastener, such as a socket head flat screw (not shown in the drawings), with one of the countersunk holes 75 and with the threaded axial bore in the cylindrical base 82. The holes 75 are countersunk on a backside 84 of the attachment plate 72 such that a head on the mechanical fastener rests flush with the surface of the attachment plate 72.

The cone shaped section 78 is also axially bored and fitted with a stud 86 which projects from a narrow end 88 of the cone shaped section 78. A free end of the stud may be rounded to have a spherical surface 90 which can nest within a socket 92 formed in a distal end 94 of an eyebolt 96. The nesting of the spherical surface 90 within the socket 92 provides the linkage 70 allowing for limited universal movement of the eyebolt 96 relative to the stud 86 and the attachment plate 72. As used herein, "limited universal movement" means that the linkage 70 permits the eyebolt 96 to move about three mutually perpendicular axes, but only through arcs of approximately 50 along two of the three axes. Movement through a full 360 is permitted with respect to the third axis. Thus, the adapter 68 that carries the stud 86 having the spherical end 90 provides a first articulating element that is pivotally mounted to the eyebolt or second articulating element 96.

In an alternative embodiment of the securing or attachment means (FIGS. 5 and 12), the anchoring device 66 may be in the form of a suction cup 98 having pump means 100 to facilitate air evacuation and vacuum formation, an example of the cup and pump being presently manufactured and marketed by Wood's PowrGrip Co., Inc. of Wolf Point, Mont. It has been found useful to modify the commercially available suction cup 98 by welding to a cap 102 of the suction cup 98, the anchor adapter 68. The anchor adapter 68 is in the form of a suction cup adapter 104 having a tapered cylindrical portion 106, a broad end 108 of which is formed integral with a base member 110. The base member 110, in turn, is rigidly secured to the cap 102 of the suction cup by, for example, welding. Analogous to the embodiment of the securing or attachment means illustrated in FIGS. 6 and 12, the tapered cylindrical portion 106 is axially bored and fitted with a stud 86 which projects from a narrow end 112 of the tapered cylindrical portion 106. The stud 86 cooperates with the eyebolt 96 in a manner identical to that described above to provide the linkage 70 which allows for limited universal movement of the eyebolt 96 relative to the stud 86 and the suction cup 98.

The securing or attachment means described in FIGS. 5 and 12 is substantially similar to that shown in the areas of interest designated by the reference numerals DA1, DA2, and DA3 in FIG. 1A. That is, in FIG. 1A, the equipment mounting apparatus 10 is secured to the vehicle 13 at points P-1A, P-2A and P-3A by the anchoring device 66 in the form of the suction cup 98.

The Interconnection Means

The interconnection means serves several purposes. First, the interconnection means forms an aspect of the securing or attachment means by connecting the same to the frame. Second, the interconnection means may secure various elements of the frame to each other. Third, the interconnection means forms an aspect of the equipment mounting means by connecting the same to the frame. The interconnection means comprises an arrangement of coupling assemblies, (hereinafter referred to simply as assemblies) which, for purposes of the discussion to follow, will be identified by Roman reference numerals X through XV. The assemblies X-XV are representative examples of the assemblies that have been found to be most useful but assemblies other than those described might be employed. The number and the arrangement of the assemblies will be determined by the complexity and requirements of the particular application in which they find use.

Each assembly X-XV, in turn, comprises one or more coupling elements (referred to hereinafter simply as couplings) which, for the purposes of the discussion to follow, will be identified by the reference numerals G-K. The couplings G-K may be combined in ways other than described to provide assemblies other than those shown in the examples. The number and the combination of couplings required will be determined by the particular application in which they find use.

Figure 2:
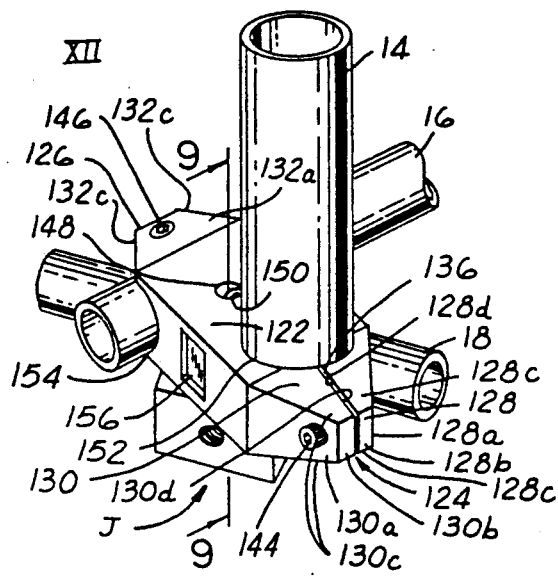
FIG. 2 is an enlarged perspective view of an area of interest designated by reference numeral A in FIG. 1.
Figure 9:
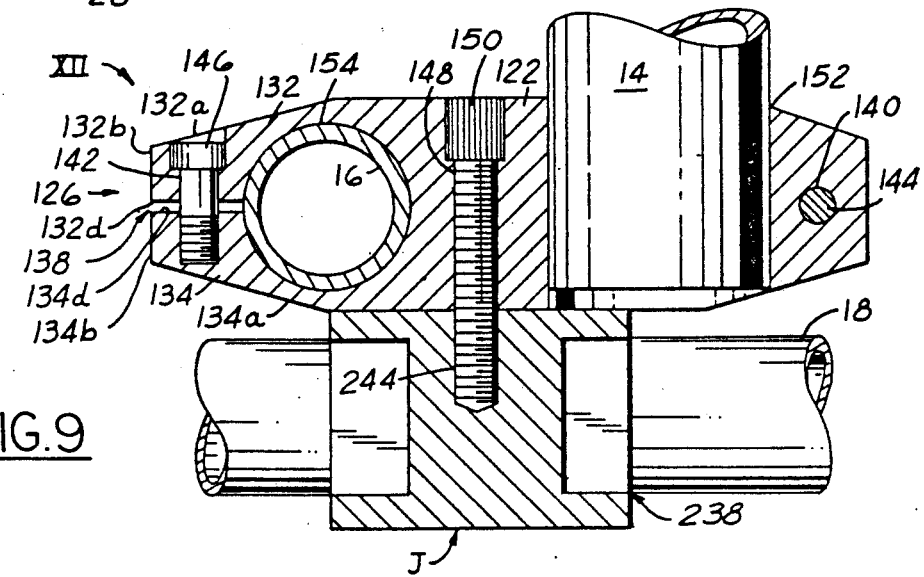
FIG. 9 is a sectional view taken along lines 9—9 in FIG. 2.

As best shown in FIGS. 2 and 9, coupling G is a bilaterally symmetrical (relative to the longitudinal axis of the coupling) aluminum member having a central block portion 122 intermediate and integral with a pair of first and second split collar portions 124, 126. The split collar portions 124, 126 comprise, respectively, a pair of tapered wings 128, 130, and 132, 134, the tapered wings being separated, respectively, by a channel 136, 138. The split collar portions 124, 126 are oriented in planes normal to each other. The tapered wings 128-134 are formed with, respectively, outer inclined surfaces 128a, 130a, 132a, 134a, endwalls 128b, 130b, 132b, 134b, pairs of beveled side surfaces 128c, 130c, 132c, 134c (the lattermost not being separately shown in the drawings), and flat inner surfaces 128d, 130d, 132d, 134d opposite the outer inclined surfaces 128a, 130a, 132a, 134a. The flat inner surfaces 128d-134d of a pair of opposed tapered wings 128-134 are in a facing relationship separated by the respective channels 136, 138.

Each split collar portion 124, 126 is further provided with, respectively, a tapped hole 140, 142, which interrupts the outer inclined surfaces 128a-134a and the flat inner surfaces 128d-134d and which receives pin means, shown in the form of a socket head cap screw 144, 146, to draw the opposed tapered wing pairs 124, 126 and 128, 130 toward each other.

The block portion 122 is provided with a threaded through hole 148 in approximately the center thereof. The through hole 148 is parallel to the tapped hole 142 and perpendicular to the tapped hole 140 and receives an adjustment bolt 150. The adjustment bolt 150 as well as the other adjustment bolts that will be referred to hereinafter may be in the form of socket head cap screws. The term "adjustment bolt" is used generally to identify a mechanical fastener or pin means which joins or fastens two couplings to each other while permitting relative rotation therebetween, as will be explained more fully below.

Also formed in the coupling G, in the regions where the central block portion 122 coincides with each split collar portion 124, 126, are circular apertures or sockets 152, 154. Each aperture 152, 154 is normal to the respective tapped hole 140, 142 and is aligned and continuous with the channel 136, 138 which separates the opposed tapered wing pairs 128, 130 and 132, 134 of the respective split collar portions 124, 126.

As explained below, the apertures 152, 154 are adapted to receive, respectively, the rail 14 and the rails 16-22. The apertures associated with the split collar portions of the couplings described below are similarly adapted to receive either the rails 16-22 or the extension rail 14, but not both. Thus, the split collar portions 124, 126 of the coupling G and the split collar portions of the couplings described below provide means for securing, clamping or gripping the rails to the couplings, wherein the opposed and tapered wings that comprise the split collar portions function as clamp jaws.

It has been found advantageous, because of the malleability of the aluminum couplings, to provide the tapped holes 140, 142 with threaded inserts (not shown separately in the drawings), an example of which is marketed under the trademark Helicoil ® by Emhart Corporation (Danbury, CT and Santa Fe Springs, Calif.). In order to reduce the weight of the coupling G, one or more milled pockets 156 may be formed therein. The coupling G and the couplings to be described below may be cast or machined.

The coupling G of FIG. 2 is substantially similar to the coupling G identified in the area of interest designated by the reference numeral AA in FIG. 1A.

As best shown in FIGS. 5, 6 and 12, coupling H is an aluminum member having a rectangular base 162 and a flat top surface 164 joined by a plurality of ramped side surfaces 166–172 that incline from the base 162 toward the flat top surface 164. The coupling H is further provided with a pair of parallel holes 174, 176. The hole 174 receives an adjustment bolt 178.

The coupling H of FIGS. 5, 6, and 12 is substantially similar to the coupling H shown in the areas of interest designated by the reference numerals DA1, DA2 and DA3 in FIG. 1A.

As best shown in FIGS. 4, 7, 10, 13, and 14, coupling I is an aluminum member having a central cube shaped portion 182 intermediate and partly integral with a pair of first and second split collar portions 184, 186. The split collar portions 184, 186 comprise, respectively, a pair of tapered wings 188, 190, and 192, 194, each pair of tapered wings being separated, respectively, by a channel 196, 198. The split collar portions 184, 186 are oriented in planes normal to each other. The tapered wings 188–194 are formed with, respectively, outer inclined surfaces 188a, 190a, 192a, 194a, end walls 188b, 190b, 192b, 194b, pairs of beveled side surfaces 188c, 190c, 192c, 194c, and flat inner surfaces 188d, 190d, 192d, 194d opposite the outer inclined surfaces 188a–194. The flat inner surfaces 188d–194d of each opposed and tapered wing pair 188, 190 and 192, 194 are in a facing relationship and separated by the respective channels 196, 198.

Each split collar portion 184, 186 is further provided with, respectively, a tapped hole 200, 202 which interrupts the inclined outer surfaces 188a–194a and the flat inner surfaces 188d–194d and which receives pin means, shown in the form of a socket head cap screw 204, 206, to draw the opposed and tapered wing pairs 188, 190 and 192, 194 toward each other. The central cube shaped portion 182 is partially cleaved to create a slot 208 which is in a plane parallel to the plane of the channel 198. The central cube shaped portion 182 is provided with a tapped hole 210 which is parallel to the tapped hole 202 formed in the second split collar portion 186.

Also formed in the coupling I, in the regions where the central cube shaped portion 182 coincides with the split collar portions 184, 186, are circular apertures or sockets 212, 214. Each aperture 212, 214 interrupts the inclined outer surfaces 188a–194a and the flat inner surfaces 188d–194d and is aligned and continuous with the respective channel 196, 198 which separate the opposed, tapered wing pairs 188, 190 and 192, 194. As noted in connection with the prior couplings, the tapped holes 200, 202, 210 may be provided with threaded inserts, and milled pockets 216 may be formed to the reduce weight of the coupling I.

The coupling I of FIGS. 4, 7, 10, 13 and 14 is substantially similar to the coupling I shown in the area of interest designated by the reference numeral FA in FIG. 1A.

Figure 8:
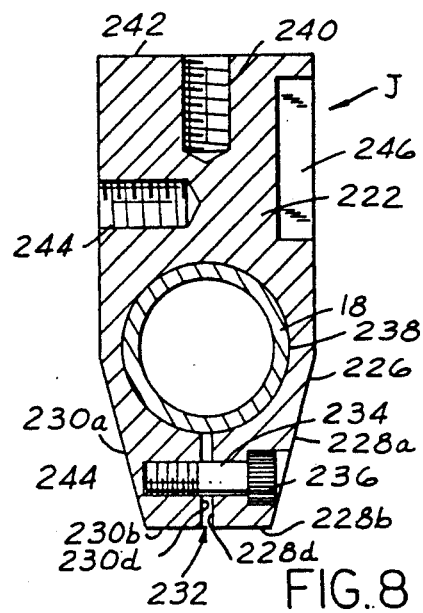
FIG. 8 is a sectional view taken along lines 8—8 in FIG. 5.

As best shown in FIGS. 5 and 8, the coupling J is an aluminum member comprising a block shaped portion 222 having formed integral at a first end 224 thereof a split collar portion 226. The split collar portion 226 has a pair of first and second tapered and opposed wing members 228, 230 separated by a channel 232. Each wing member 228, 230 comprises, respectively, an outer inclined surface 228a, 230a, an end wall 228b, 230b, a pair of beveled side surfaces 228c, 230c, and an inner flat surface 228d, 230d opposite the outer inclined surfaces 228a, 230a. The inner flat surfaces 228d, 230d are in a facing relationship and separated by the channel 232. The split collar portion 226 is provided with a tapped hole 234 which interrupts the outer inclined surfaces 228a, 230a and the flat inner surfaces 228d, 230d and which receives pin means, shown in the form of a socket head cap screw 236, to draw the tapered wings 228, 230 toward each other.

In the region where the split collar portion 226 coincides with the block shaped portion 222, the coupling J is provided with a circular aperture or socket 238 which is normal to the tapped hole 234 and which is aligned and continuous with the channel 232. A tapped hole 240, which is normal to the tapped hole 234, is formed in a second end 242 of the block shaped portion 222, the second end 242 being opposite the first end 224. Also formed in approximately a central section of the block shaped portion 222 is a hole 244 which is parallel to the tapped hole 234 and perpendicular to the tapped hole 240. As noted in conjunction with the prior couplings, the tapped holes 234, 240, 244 may be fitted with threaded inserts (not shown separately in the drawings) and the coupling J may be formed with milled pockets 246 to reduce its weight.

The coupling J of FIGS. 5 and 8 is substantially similar to the coupling J shown in the areas of interest designated by the reference numerals DA1, DA2 and DA3 in FIG. 1A.

Figure 3:
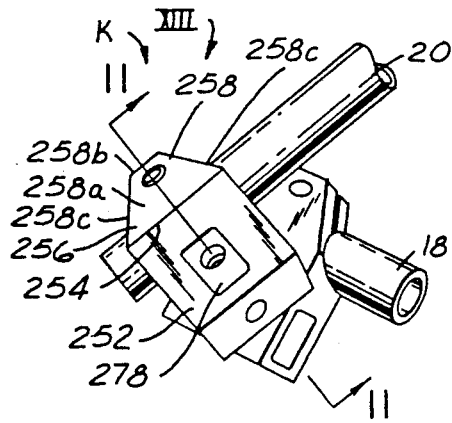
FIG. 3 is an enlarged perspective view of an area of interest designated by reference numeral B in FIG. 1.

As best shown in FIGS. 3 and 11, the coupling K is a cast aluminum member comprising a block shaped portion 252 having formed integral at a first end 254 thereof a split collar portion 256. The split collar portion 256 has a pair of first and second tapered and opposed wing members 258, 260 separated by a channel 262. Each wing member 258, 260 comprises an outer inclined surface 258a, 260a, an end wall 258b, 260b, a pair of beveled side surfaces 258c, 260c (the latter not being shown separately in the drawings), and an inner flat surface 258d, 260d opposite the outer inclined surfaces 258a, 260a. The inner flat surfaces 258d, 260d are in a facing relationship and separated by the channel 262. The split collar portion 256 is provided with a tapped hole 264 which interrupts the outer inclined surfaces 258a, 260a and the flat inner surfaces 258d, 260d, and which receives pin means, shown in the form of a socket head cap screw 266, to draw the tapered wings 258, 260 toward each other.

In the region where the split collar portion 256 coincides with the block shaped portion 252, the coupling K is provided with a circular aperture or socket 268 which is perpendicular to the tapped hole 264 and which is aligned and continuous with the channel 262. A tapped hole 270 which is perpendicular to the tapped hole 264 is formed in a second end 272 of the block shaped portion 252, the second end 272 being opposite the first end 254. Also formed in approximately a central portion of the block shaped portion 252 is a threaded through hole 274 which is parallel to the tapped hole 264 and normal to the tapped hole 270 and which receives an adjustment bolt 276. As noted in conjunction with the prior couplings, the tapped holes 264, 270 may be fitted with threaded inserts (not shown separately in the drawings) and the coupling K may be formed with milled pockets 278 to reduce its weight.

The coupling K differs from the coupling J only in that the tapped hole 244 in the coupling J is replaced by the through hole 274 in the coupling K, the tapped hole 244 not entirely penetrating the block shaped portion 222.

Assembly and Operation

The equipment mounting apparatus 10 is assembled by combining the various elements comprising the above described frame, equipment mounting means, securing or attachment means, and interconnection means. For purposes of illustration, the arrangements shown in FIGS. 1 and 1A will be described. However, it should be understood that the equipment mounting apparatus 10 is a dynamic system for positioning a piece of equipment at an arbitrary location with respect to the vehicle to which the equipment is mounted. The exact combination and orientation of components which comprise the apparatus 10 will be determined by the requirements of the particular situation including the task to be accomplished and the type of vehicle to which the equipment is to be mounted. Thus, the arrangements of FIGS. 1 and 1A are merely exemplary of a potentially infinite number of constructions.

As noted above, the interconnection means serves several purposes: it forms an aspect of the securing or attachment means by connecting the same to the frame, it secures the various elements of the frame to each other, and it forms an aspect of the equipment mounting means by connecting the same to the frame. The different purposes are accomplished by combining one or more of the couplings G-K to form the assemblies, representative examples of which will be identified by the Roman reference numerals X through XV and described below. Assemblies other than those described may be used depending on the particular application.

In utilizing the equipment mounting apparatus 10, it is often advantageous to begin by attaching the various frame members to each other. Several assemblies may be used to secure various elements of the frame to each other. For example, assembly XII, which is shown in the area of interest designated by the reference numeral A in FIG. 1 and in FIGS. 2 and 9, as well as in the area of interest designated by the reference numeral AA in FIG. 1A, secures the extension rail 14 and the rails 16, 18. The assembly XII comprises the coupling G and the coupling J which are joined or fastened together by the registration of the adjustment bolt 150 associated with the coupling G with the tapped hole 244 associated with the coupling J. The angular relationship of the couplings G and J relative to one another may be adjusted by rotating or pivoting either coupling about the longitudinal axis of the adjustment bolt 150. The rail 18 is received by the aperture 238 in the coupling J which is secured to the same by tightening the socket head cap screw 236 resulting in the tapered wings 228, 230 of the split collar portion 226 tightly engaging the rail 18.

Similarly, the rail 16 is received by the aperture 154 of the coupling G. The socket head cap screw 146 is tightened to enable the tapered wings 132, 134 of the split collar portion 126 to engage the rail 16. The extension rail 14 is inserted within the aperture 152 of the coupling G and the socket head cap screw 144 is tightened to constrict the tapered wings 128, 130 of the split collar portion 124 about the extension rail 14.

Because a triple articulated system is created by attaching the securing means and the interconnection means to the vehicle 12 or 13, the assembly XII may be located as close to or as far from the vehicle as the application demands. The distance from the vehicle 12 or 13 may be increased by using rails 16, 18 having a greater length or the distance may be decreased by crossing the rails at a point closer to the vehicle 12 or 13. The rails may be positioned arbitrarily with respect to the vehicle 12 and 13 and with respect to each other.

The extension rail 14 which is secured to the assembly XII may be oriented to the desired position by manipulating the couplings G and J prior to tightening the socket head cap screws 144, 146, 236 and the adjustment bolt 150. The couplings G and J are rotatable with respect to each other and the rails 16, 18 are slidable and rotatable within their respective apertures 154, 238 in the couplings G and J.

Because the assembly XII maintains the rails 16, 18 in a crossed or non-parallel relation, the extension rail 14, once secured to the coupling G, is rigidly and immovably mounted. Unlike certain systems which are presently known, rotation of the extension rail 14, the rail to which the equipment mounting means is secured, about the rails 16, 18 is absolutely prevented when the two rails 16, 18 are maintained in a crossed or non-parallel relationship by the assembly XII and when the extension rail 14 is secured to the assembly XII.

Moreover, rotational movement of the extension rail 14 relative to the rails 16, 18 is not possible even if the equipment mounting apparatus 10 were not attached to the vehicle 12 and even if the rails 20, 22 were not provided, as in FIG. 1. That is to say, if the equipment mounting apparatus comprised nothing more than the rails 16, 18, the extension rail 14, and the assembly XII, all oriented as shown in FIG. 2 or the area of interest designated by the reference numeral AA in FIG. 1A, then the extension rail 14 and the associated equipment mounting means would not be rotatable about the rails 16, 18. Therefore, the assembly XII also provides a novel design for locking a first member (extension rail 14) against rotational movement about second and third members (rails 16, 18) when the second and third members are maintained in a crossed or non-parallel relation by the assembly XII.

Assembly XIII, as best shown in the area of interest designated by the reference numeral B in FIG. 1 and in FIGS. 3 and 11, may also be used to secure various elements of the frame to each other. Assembly XIII comprises the coupling J and the coupling K which are joined by the registration of the adjustment bolt 276 associated with the coupling K with the tapped hole 244 associated with the coupling J. The two couplings are rotatable about the longitudinal axis of the adjustment bolt 276 and may be positioned to assume any angular orientation with respect to each other. The rail 20 is received by the aperture 268 of the coupling K and is slidable and rotatable therein. Once the rail 20 has been properly oriented (the proper orientation being determined by the particular application) it may be secured to the coupling K by tightening the socket head cap screw 266 to draw the opposed and tapered wings 258, 260 toward each other which results in circumferential constriction of the split collar portion 256 about the rail 20. Similarly, the rail 18 is received by the aperture 238 of the coupling J and the split collar portion 226 is constricted about the rail 18 by tightening the socket head cap screw 236 to draw the tapered and opposed wings 228, 230 of the split collar portion 226 toward each other.

Elements of the frame may also be secured to each other with the assembly XIV, as best shown in the area of interest designated by the reference numeral C in FIG. 1 and in FIGS. 4, 10 and 14. The assembly XIV comprises the coupling I and the coupling K which are joined together by the registration of the adjustment bolt 276 associated with the coupling K with the tapped hole 210 in the coupling I. The couplings are free to rotate about the longitudinal axis of the adjustment bolt 276 to assume any angular orientation with respect to each other. The rail 22 is received by the aperture 268 of the coupling K and the split collar portion 256 is tightened with the socket head cap screw 266 as described hereinabove in conjunction with the assembly XIII. The rail 22 is slidable and rotatable with respect to the aperture 268. Similarly, the extension rail 14 is received by the aperture 214 of the coupling I and the socket head cap screw 266 is tightened to draw the tapered and opposed wings 192, 194 of the split collar portion 186 toward each other.

Once the frame members have been secured to each other, the frame may be connected to the securing or attachment means by way of the various couplings and assemblies. This process is facilitated by first joining the appropriate assemblies to the anchoring device, the anchor adapter and the linkage allowing for limited universal movement, followed by mounting the anchoring device to the support means (the vehicle 12 or 13).

Assembly X, which is best shown in the area of interest designated by the reference numeral D in FIG. 1 and in FIGS. 5, 8, and 12, and also shown in the areas of interest in FIG. 1A designated by the reference numerals DA1, DA2 and DA3, is one example of how the frame may be attached to the securing means. Assembly X comprises the coupling J and the coupling H which are joined together by the registration of the adjustment bolt 178 associated with the coupling H with the tapped hole 240 in the second end 242 of the block shaped portion 222 of the coupling J.

Alternatively, the assembly XI may attach the securing means to the frame. Assembly XI (not shown separately in the drawings) comprises the coupling H (FIGS. 5, 6 and 12) and the coupling K (FIGS. 3 and 11) which are joined or fastened together by the reception of the adjustment bolt 178 of coupling H by the tapped hole 270 in the second end 272 of the block shaped portion 252 of the coupling K.

The angular relationship of the coupling pairs H and J or H and K may be manipulated by rotating either coupling in each pair about the longitudinal axis of the adjustment bolt 178.

The interconnection means represented hereinabove by the assemblies X and XI is connected to the limited universal movement linkage 70 of the securing means by the registration of the eyebolt 96 with the hole 176 in the coupling H.

The interconnection means is mounted to the vehicle 12 or 13 by attaching the anchoring device 66 of the securing means to an appropriate surface on the vehicle 12 or 13. Referring to FIG. 1, the securing means is shown to be attaching the equipment mounting apparatus 10 to the vehicle 12 at the four locations P-1 through P-4; however, the number and position of the points of engagement will vary according to the particular application. As noted hereinabove, and as shown in FIG 1A, a minimum of three non-collinear points of attachment between the equipment mounting apparatus 10 and the support means (the hood 13a of the vehicle 13) are needed for successful practice of the invention. Whether additional points of attachment may be advantageous depends upon the requirements of the situation.

Similarly, whether the user elects the anchoring device 66 in the form of the square attachment plate 72 or the suction cup 98 will be determined by the physical characteristics of the vehicle to which the equipment is to be mounted. If the anchoring device 66 is in the form of the square attachment plate 72, the anchoring device 66 may be readily secured to arbitrarily shaped objects such as the roll bar 12b at P-2 (FIGS. 1 and 6), a fender, or other appropriate structural element of the vehicle 12 by use of bolt means 280 (shown in the form of a U-bolt). However, other mechanical fastener which are adapted to register with the through holes 74 can be used. The anchoring device 66 in the form of a suction cup 98 is useful for mattingly engaging the securing means with substantially flat surfaces such as the side panel 12a at P-1, P-4 (FIGS. 1 and 5), the windshield 12c at P-3 (FIG. 1), the hood 13a at P-1A, P-2A, P-3A (FIG. 1A), or the roof or rear deck. When the suction cup 98 is utilized it has been found helpful to moisten the surface to which the suction cup is to be secured as this facilitates vacuum formation.

Once the securing means including the associated assembly have been mounted to the vehicle 12 or 13, the frame may be attached to the securing means by way of the assembly. For example, at P-1 (FIG. 1) and P-1A (FIG. 1A), and as best shown in FIGS. 5 and 8, the rail 18 is received within the aperture 238 of the coupling J and the socket head cap screw 236 is tightened to draw the opposed and tapered wings 228, 230 toward each other and circumferentially constrict the split collar portion 226 about the rail 18. Thus the rail 18 is securely retained by the coupling J and the assembly X. Because the rail 18 is slidable and rotatable within the aperture 238 before the screw 236 is tightened, the coupling J may be positioned at any circumferential and longitudinal point on the rail 18. Similarly, at P-2, P-3, and P-4 the rail 18 is replaced by, respectively, rail 20, rail 22, and rail 16 which are received by the aperture 238 and securely retained by the coupling J by tightening the socket head cap screw 236. In FIG. 1A, each end of the rail 16 is respectively received by a separate aperture 238 in a separate coupling J such that tightening the respective socket head cap screws 236 securely retains the respective couplings on opposite ends of the rail 16.

Alternatively, and as described hereinabove, the assembly XI may attach the frame to the securing means. The assembly XI comprises the coupling H (FIGS. 5, 6 and 12) and the coupling K (FIGS. 3 and 11). The rails 16-22 are received by the aperture 268 of the coupling K and the socket head cap screw 266 is tightened to draw the opposed and tapered wings 258, 260 toward each other. This results in circumferential constriction of the split collar portion 256 of the coupling K about the rails 16-22.

The rails 16-22 which are attached to the coupling J in the assembly X or, alternatively the coupling K in the assembly XI, are horizontally rotatable with respect to the coupling H because the couplings H and J or H and K are free to pivot with respect to each other about the longitudinal axis of the means allows for limited universal movement of the rails 16-22 relative to the anchoring device 66 and the vehicle 12 or 13. As well, the rails 16-22 are slidable and rotatable within the aperture 238 of the coupling J or the aperture 268 of the coupling K prior to tightening the respective split collar portions 226, 256 about the rails 16-22. Thus, once the securing means including the associated assembly have been attached to the vehicle 12 or 13, a triple articulated system has been created which allows any rail 16-22 to be positioned parallel, perpendicular or at any intermediate angular relationship relative to the vehicle 12 or 13.

Unlike certain systems presently known, the rails 16–22 of the equipment mounting apparatus 10 may approach the vehicle 12 or 13 at an arbitrary angle. As well, the rails 16–22 may be oriented parallel, perpendicular or at a pitched angular relation with respect to each other. Further, and also unlike those systems which are known, the equipment mounting apparatus 10 may be secured to a surface of arbitrary shape.

Thus, it can be seen that the rails 16–22 are adapted for universal movement relative to the support means (the vehicle 12 or 13). By universal movement, it will be understood that this means that the rails are free to move about three mutually perpendicular axes such that the rails may be positioned at any point within a hemisphere having its center at approximately the point of attachment to the support means. The universal movement results from the fact that (1) when the rails are attached to the coupling J or K, respectively in the assemblies X and XI, they are rotatable with respect to the coupling H, because the coupling H is rotatably mounted to the coupling J or K, and (2) the linkage 70 allows for limited universal movement of the rail relative to the support means. In combination, the rotatable mounting of the two couplings in the assembly to each other and the limited universal movement afforded by the linkage 70 enables the rails, when attached to the support means by the securing or attachment means, to have universal movement relative to the support means.

It will be apparent that although the securing or attachment means has sometimes been described hereinabove as comprising the anchoring device 66, the anchor adapter 68, and articulating means (the linkage 70), the capability of universal movement possessed by the rails is not possible unless the assembly X or XI is considered. Therefore, in its broadest sense, the securing or attachment means comprises not only the anchoring device 66, the anchor adapter 68, and the linkage 70 but also the assembly X or XI. In this respect, the assemblies X and XI are dual function devices. First, they cooperate with the anchoring device 66, the anchoring adapter 68, and the articulating means 70 to provide the universal movement described above. Second, they serve to attach the rails or frame to the support means by interconnecting the rails with the linkage 70, which is directly secured to the support means.

The interconnection means also serves to secure the equipment mounting means to the frame. The assembly XV, which is best shown in the area of interest designated by the reference numeral F in FIG. 1 and in FIGS. 7 and 13, as well as in the area of interest designated by the reference numeral FA in FIG. 1A, comprises the coupling I and the equipment mount or bracket 24. The mounting member or post 60 of the equipment mount 24 is received by the aperture 212 of the coupling I and the mount or bracket 24 is secured to the same by tightening the socket head cap screw 206 to draw the opposed and tapered wings 188, 190 of the split collar portion 184 toward each other. The post 60 of the equipment mount 24 is rotatable within the aperture 212 and may be oriented to accommodate the needs of a given situation prior to tightening the screw 206.

The equipment mount 24 is intended to be mounted to the extension rail 14. Accordingly, the extension rail 14 is received by the aperture 214 in the coupling I and the socket head cap screw 206 is tightened to constrict the split collar portion 186 about the extension rail 14 as described hereinabove in conjunction with the assembly XIV. Because the extension rail 14 is slidable and rotatable with respect to the coupling I, the equipment mount 24 may be positioned anywhere along the length and about the circumference of the extension rail 14.

Further, and not found in those systems presently known, the position of the equipment attached to the equipment mounting means may be significantly altered once the basic configuration of the equipment mounting apparatus has been established. The equipment is movable with respect to the equipment mount 24, the equipment mount 24 is rotatable with respect to the coupling I, and the coupling I is slidable and rotatable with respect to the extension rail 14, all without disassembling the basic structure of the apparatus.

It will be apparent that because the equipment mount 24 is rotatable with respect to the coupling I and because the coupling I is rotatable with respect to the extension rail 14, the equipment mount is adapted for universal movement relative to the extension rail. That is to say, a camera or other piece of equipment that is attached to the equipment mount 24 may be positioned at any point on a spherical surface having as its approximate center, the point at which the equipment mount is secured to the extension rail.

Although the equipment mounting means has been described hereinabove as comprising the equipment mount 24, the capability of universal movement is not possible without the coupling I. Thus it will be understood that, in the broadest sense, the equipment mounting means comprises not only the coupling I but also the equipment mount 24, which combination has been designated as the assembly XV.

The extension rail 14 is formed to have a larger diameter than the rails 16–22 to increase its structural integrity because the extension rail is required to support the weight of the equipment and the equipment mounting means. However, it should be understood that the extension rail 14 may be formed to have a diameter substantially the same as the diameter of the rails 16–22. In such an arrangement the aperture 152 in the coupling G and the aperture 214 in the coupling I would require modification to receive the rail 14 of reduced diameter. The rails of this arrangement would be fully interchangeable and any coupling could be used in conjunction with any rail. The relative dimensions of the rails form no part of the invention in its broader aspects.

In those assemblies which combine two or more couplings, it has been found advantageous to provide washers at each coupling to coupling interface to prevent galling. Washers formed of a resinous polyester material, such as Mylar ®, which is presently manufactured and marketed by E. I. duPont deNemours & Co., Wilmington, Del., are useful.

Thus it can be seen that the coupling assemblies X-XV comprise, in the disclosed examples, first and second coupling elements (G-K) Each coupling element or coupling includes at least one means for receiving one of the rails or frame members, said means being in the form of a circular aperture or socket formed in the coupling. The rails and couplings are slidable for relative longitudinal movement with respect to each other. Each coupling further includes means for securing, clamping or gripping the rail or frame member at a pre-selected longitudinal position relative to the coupling, the securing means being in the form of an adjustable split collar portion having pin means for drawing the opposed wings or jaws of the split collar toward each other to tightly engage the rail.

Reduced to its most basic form, the invention, as illustrated in FIG. 1A, is for an apparatus for mounting an article, which is shown in the form of a movie camera, on support means, which is shown in the form of the hood 13a of the motor vehicle 13. The mounting apparatus comprises a frame having at least three elongated frame members or rails and means for attaching the frame to the support means at at least three non-collinear locations thereon. The means for attaching to the support means is shown in the form of the suction cup 98 (or, alternatively, as shown in FIG. 1, the square attachment plate 72) in combination with the assembly X. The three non-collinear locations are identified by the reference numerals P-1A, P-2A and P-3A.

The apparatus in its most basic form further comprises a coupling assembly identified as the assembly XII that, in turn, comprises first and second coupling elements, respectively designated as couplings J and G. The first coupling element has first means, shown as the aperture 238, for receiving a first frame member (the rail 18) for relative movement therebetween longitudinally of the first frame member. The first coupling element also includes first means for securing the first frame member at a preselected longitudinal position relative to the first coupling, the securing means being identified hereinabove as the split collar portion 226.

The second coupling element for the coupling assembly XII has second means, the aperture 154, for receiving a second frame member (the rail 16) for relative movement therebetween longitudinally of the second frame member. The second coupling element also includes second means for securing the second frame member at a preselected longitudinal position relative to the second coupling element, the securing means being identified hereinabove as the split collar portion 126.

In addition, the second coupling element includes first means, the aperture 152 in combination with the associated split collar portion 124, for connecting a third frame member (the rail 14), the third frame member being adapted to support the article (shown as a movie camera) thereon.

The coupling assembly XII also comprises means for fastening the first and second coupling elements to one another, the fastening means being shown in the form of the registration of the adjustment bolt 150 associated with the coupling G with the tapped hole 244 associated with the coupling J. When assembled in this manner, the first and second receiving means are disposed to receive the first and second frame members in non-parallel relationship to one another. Rotational movement of the third frame member, and the article attached thereto, about the first and second frame members is absolutely prevented when the assembly XII is utilized.

Although a suggested method of assembly has been described, it should be noted that the order in which the various components will be assembled will largely be determined by the particular application. For example, it may be useful to secure one of the rails to the support means prior to having made all of the interconnections among the rails. Those having ordinary skill in the art will readily be able to determine the most efficient method for assembling the equipment mounting apparatus in a particular situation. Although straps for further securing the apparatus to the vehicle are not essential for successful practice of the invention, it may be advantageous to employ them, especially in circumstances where the equipment may be subject to vigorous vibration.

While the invention has been described in connection with a preferred embodiment, it will be understood that the invention is not intended to be limited to that embodiment. On the contrary, all alternatives, modifications and equivalents as may be included within the spirit and scope of the invention as defined by the appended claims are intended.

We claim:

1. An apparatus for mounting an article on support means, said mounting apparatus comprising:
   a frame having at least three elongated frame members;
   means for attaching said frame to the support means at least three noncolinear locations thereon;
   a coupling assembly comprising first and second coupling elements, said first coupling element having first receiving means for receiving a first one of said frame members for relative movement therebetween longitudinally of said first frame member, and first securing means for securing said first frame member at a preselected longitudinal position thereof relative to said first coupling element, said second coupling element having second receiving means for receiving a second one of said frame members for relative movement therebetween longitudinally of said second frame member, second securing means for securing said second frame member at a preselected longitudinal position thereof relative to said second coupling element, and first means for connecting to said second coupling element a third one of said frame members, said third frame member being adapted to support the article thereon, said coupling means further comprising means for fastening said first and second coupling elements to one another with said first and second receiving means disposed to receive said first and second frame members in nonparallel relationship to one another; and
   mounting means adapted to adjustably mount the article on said third frame member for universal movement about three mutually perpendicular axes relative to said third frame member.

2. An apparatus according to claim 1, wherein said fastening means comprises pivot means for permitting relative rotation between said first and second coupling elements.

3. An apparatus according to claim 2, wherein said fastening means comprises pin means interconnecting said first and second coupling elements for relative rotational movement therebetween.

4. An apparatus according to claim 1, wherein each of said first and second coupling elements comprises a block-like member; and
   said first and second receiving means comprise first and second openings extending through the respective block-like members, said first and second openings being adapted to slidably receive therein the respective first and second frame members.

5. An apparatus according to claim 4, wherein each of said first and second receiving means is configured to permit rotation of the respective frame member relative to the respective coupling element about a longitudinal axis of the respective frame member.

6. An apparatus according to claim 5, wherein each of said first and second openings is circular in cross section.

7. An apparatus according to claim 5, wherein said first and second securing means comprise respective first and second means for clamping surfaces of the respective first and second frame members to secure said first and second frame members to the respective coupling elements.

8. An apparatus according to claim 7, wherein said first and second clamping means comprise respective first and second split collars having respective first and second pairs of opposed jaws, inner surfaces of said first and second pairs of jaws defining said first and second openings, respectively, said first and second clamping means further having respective first and second means for drawing the respective first and second pairs of jaws toward one another to secure the respective first and second frame members between the first and second pairs of jaws.

9. An apparatus according to claim 8, wherein said first and second drawing means comprise respective first and second pin means interconnecting the respective first and second pairs of jaws.

10. An apparatus according to claim 1, wherein said first connecting means is configured to permit rotation of said third elongated frame member relative to said second coupling element about a longitudinal axis of said third elongated frame member.

11. An apparatus according to claim 10, wherein said second coupling element comprises a block-like member; and
said first connecting means comprises a first socket formed in said second coupling element and adapted to receive an end of said third elongated frame member.

12. An apparatus according to claim 11, wherein said first socket is circular in cross section.

13. An apparatus according to claim 11, wherein said first socket is adapted to position said third elongated frame member with its longitudinal axis nonparallel to a longitudinal axis of said second frame member supported by said second receiving means.

14. An apparatus according to claim 11, wherein said first connecting means further comprises first means for gripping a surface of said third frame member to secure said third frame member to said second coupling element at a preselected position relative thereto.

15. An apparatus according to claim 14, wherein said first gripping means comprises a first split collar member having a first pair of opposed wings, inner surfaces of said first pair of wings defining said first socket, said first gripping means further having first means for moving said first pair of wings toward one another to secure said third elongate frame member therebetween.

16. An apparatus according to claim 15, wherein said first moving means comprises a first pin interconnecting said first pair of wings and adapted to draw said first pair of wings toward one another.

17. An apparatus according to claim 1, wherein said attaching means is adapted to mount at least two of said frame members on the support means at said three non-colinear locations.

18. An apparatus according to claim 1, wherein said attaching means comprises a plurality of attachment assemblies, at least one said attachment assemblies being adapted to adjustably mount one of said frame members on the support means for universal movement about three mutually perpendicular axes relative to the support means.

19. An apparatus according to claim 18, wherein said one attachment assembly comprises means for anchoring said one attachment assembly to the support means, a third coupling element for connecting said one attachment assembly to said one frame member, and articulating means for interconnecting said anchoring means and said third coupling element for universal movement relative to one another about three mutually perpendicular axes.

20. An apparatus according to claim 19, wherein said articulating means comprises a first articulating element adapted to be mounted on said anchoring means, a second articulating element adapted to be mounted on said third coupling element, first pivot means movably mounting said first articulating element on said second articulating element, and second pivot means movably mounting said second articulating element on said third coupling element, said first and second pivot means adapted to cooperate to permit universal movement of said third coupling element relative to said anchoring means.

21. An apparatus according to claim 20, wherein said first pivot means comprises a spherical member carried by an end of said first articulating element and a socket formed within a portion of said second articulating element, said spherical member being securely received within said socket to permit limited universal movement of said second articulating element relative to said first articulating element; and
said second pivot means comprises a cylindrical member interconnecting said second articulating element and said third coupling member for relative rotational movement therebetween.

22. An apparatus according to claim 21, wherein said one attachment assembly further comprises means for fixing said second articulating element at a preselected position relative to said third coupling element.

23. An apparatus according to claim 21, wherein said anchoring means comprises a plate engageable with the support means and means for securely holding said plate to the support means.

24. An apparatus according to claim 23, wherein said plate having a multiplicity of holes therethrough and said holding means comprises bolt means interconnecting the support means and said plate through at least a selected one of said holes.

25. An apparatus according to claim 23, wherein said first articulating element has a threaded bore therein and said one attachment assembly further comprises a screw adapted to extend through a selected one of said holes and engage said threaded bore to secure said first articulating element to said plate.

26. An apparatus according to claim 21, wherein said anchoring means comprises a suction cup adapted to mattingly engage a surface of the support means.

27. An apparatus according to claim 26, wherein said anchoring means further comprises pump means for evacuating air between said suction cup and the surface of the support means.

28. An apparatus according to claim 19, wherein said third coupling element comprises a third means for receiving said one frame member for relative movement therebetween longitudinally of said one frame member, and third means for securing said one frame member at a preselected longitudinal position thereof relative to said third coupling element.

29. An apparatus according to claim 28, wherein said third coupling element comprises a block-like member and said third receiving means comprises a third opening through said third coupling element and adapted to slidably receive in said third opening said one elongate frame member.

30. An apparatus according to claim 29, wherein said third receiving means is configured to permit rotation of said one frame member relative to said third coupling element about a longitudinal axis of said one frame member.

31. An apparatus according to claim 30, wherein said third opening is circular in cross section.

32. An apparatus according to claim 31, wherein said third securing means comprises third means for clamping a surface of said one frame member to said third coupling element.

33. An apparatus according to claim 32, wherein said third clamping means comprises a third split collar having a third pair of opposed jaws, inner surfaces of said third pair of jaws defining said third opening, said third clamping means further having third means for drawing said third pair of jaws toward one another to secure said one frame member therebetween.

34. An apparatus according to claim 33, wherein said third drawing means comprises third pin means interconnecting said third pair of jaws.

35. An apparatus according to claim 1, wherein said mounting means comprises a bracket for supporting the article and a fourth coupling element having fourth means for receiving said third frame member for rotational movement of said fourth coupling element about a longitudinal axis of said third frame member, said fourth coupling element further having second means for connecting said bracket to said fourth coupling element for rotational movement relative thereto, said fourth receiving and second connecting means being adapted to cooperate to permit universal movement of said bracket relative to said third frame member about three mutually perpendicular axes.

36. An apparatus according to claim 35, wherein said bracket comprises a mounting member, said fourth coupling element comprises a block-like member, said fourth receiving means comprises a fourth opening through said fourth coupling element and being adapted to slidably and rotatably receive said third frame member, and said second connecting means comprises a second socket formed in said fourth coupling element and adapted to rotatably and slidably receive said mounting member of said bracket.

37. An apparatus according to claim 36, wherein said fourth coupling element comprises fourth means for securing said fourth coupling element at a preselected longitudinal position relative to said third frame member.

38. 9. An apparatus according to claim 37, wherein said fourth opening and said second socket are circular, in cross section.

39. An apparatus according to claim 38, wherein said fourth securing means comprises fourth means for clamping a surface of said third frame member to secure said third frame member to said fourth coupling element at a preselected position relative thereto, said second connecting means further comprising second means for gripping a surface of said mounting member of said bracket to secure said bracket at a preselected position relative to said fourth coupling element.

40. An apparatus according to claim 39, wherein said fourth clamping means comprise a fourth split collar portion having a fourth pair of opposed jaws, inner surfaces of said fourth pair of jaws defining said fourth opening, said fourth clamping means further having fourth means for drawing said fourth pair of jaws toward one another to secure said third frame member between the fourth pair of jaws, said second gripping means comprising a second split collar member having a second pair of opposed wings, inner surfaces of said second pair of wings defining said second socket, said second gripping means further having second means for moving said second pair of wings toward one another to secure said mounting member of said bracket between said second pair of wings.

41. An apparatus according to claim 40, wherein said fourth drawing means and said second gripping means further comprises respective fourth pin means and a second pin, interconnecting the respective fourth pair of jaws and the second pair of wings.

42. An apparatus according to claim 41, wherein said bracket is substantially L-shaped and includes a first leg for supporting the article and a second leg disposed in nonparallel relationship to said first leg, said second leg having secured thereto said mounting member of said bracket.

43. An apparatus according to claim 42, wherein said bracket further includes reinforcing means disposed between said first and second legs for resisting relative deflection of said first and second legs.

44. An apparatus according to claim 42, wherein said first leg of said bracket has formed thereon a support plate; and said mounting means further comprises means for fixing an article to said support plate.

45. An apparatus according to claim 43, wherein said fixing means comprises a multiplicity of holes extending through said support plate and at least one stud adapted to be selectively set in registry with at least one of said holes and threadably engage a threaded socket of the article to fix the article to said support plate.

* * * * *